(12) United States Patent
Vornhem et al.

(10) Patent No.: US 6,945,907 B2
(45) Date of Patent: Sep. 20, 2005

(54) METHOD AND APPARATUS FOR CONTROLLING THE OPERATION OF A MOTOR VEHICLE DRIVE TRAIN

(75) Inventors: Martin Vornhem, Bühl (DE); Michael Reuschel, Ottersweier (DE); Christian Lauinger, Baden-Baden (DE); Franz Bitzer, Friedrichshafen (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 49 days.

(21) Appl. No.: 10/754,470

(22) Filed: Jan. 9, 2004

(65) Prior Publication Data
US 2004/0204287 A1 Oct. 14, 2004

(30) Foreign Application Priority Data
Jan. 9, 2003 (DE) .......................................... 103 00 421

(51) Int. Cl.$^7$ .............................................. B60K 41/12
(52) U.S. Cl. ............................ 477/48; 477/905; 701/54
(58) Field of Search ........................... 477/37, 48, 904, 477/905; 701/54, 60

(56) References Cited

U.S. PATENT DOCUMENTS 6,104,976 A * 8/2000 Nakamura ..................... 701/95
6,345,221 B2 * 2/2002 Hattori et al. ................ 701/51

* cited by examiner

Primary Examiner—Dirk Wright
(74) Attorney, Agent, or Firm—Alfred J. Mangels

(57) ABSTRACT

A target engine rotational speed depending at least upon the position of an accelerator pedal position and a motor vehicle speed is determined in a method for controlling the operation of a motor vehicle drive train having a drive motor and a branched power transmission with several steplessly adjustable transmission ratio regions, between which shifting takes place at a predetermined range shift transmission ratio. A transmission ratio corresponding to the target engine rotational speed and vehicle speed is determined and set, whereby the change with respect to time of the accelerator pedal position and/or the change with respect to time of the target engine rotational speed is used for determining the target engine rotational speed and is filtered when a difference between the actual transmission ratio and a transmission ratio shift range falls below a limit value.

6 Claims, 3 Drawing Sheets

| Shift Table | | | |
|---|---|---|---|
|  | KR | K1 | K2 |
| R | x | — | — |
| N | — | — | — |
| D-LOW | — | x | — |
| D-HIGH | — | — | x |

METHOD AND APPARATUS FOR CONTROLLING THE OPERATION OF A MOTOR VEHICLE DRIVE TRAIN

BACKGROUND OF THE INVENTION

1. Field of the Invention

The present invention relates to a method and an apparatus for controlling the operation of a motor vehicle drive train. More particularly, the present invention relates to a method and an apparatus for controlling the operation of a motor vehicle drive train having a drive motor and a branched power transmission with several steplessly adjustable transmission ratio ranges, and between which shifting takes place at a predetermined transmission ratio shift range.

2. Description of the Related Art

Transmissions with steplessly adjustable transmission ratios enjoy increasing popularity in passenger cars, not only because of the riding comfort made possible, but also because of possible fuel consumption reductions. Their power capacity is generally limited by their torque-transmitting capacity and the transmission ratio spread range of the variable speed unit. For example, the variable speed unit can be constructed in the form of a belt-driven, conical pulley transmission with two pairs of conical pulleys, about which an endless torque-transmitting means, for example a plate-link chain, revolves. Adjustment of the transmission ratio takes place though an opposite change in the spacing between the disks of the conical pulley pairs. Another form of a variable speed unit is a friction disc transmission, in which the effective radius on which wheels or disks or other rolling bodies is changed.

It is known to widen the spread range of such transmissions having continuously adjustable transmission ratios by operating them with power branching. The transmission ratio range of the variable speed unit is thereby run through two adjacent transmission ratio ranges in opposite directions, so that the transmission enables a larger spread in relation to that of the variable speed unit.

One problem in the course of shifting between the transmission ratio ranges of such branched power transmissions lies in oscillations or instabilities in range shifts as they occur, when, for example, during or shortly after a range shift of the motor vehicle drive train, for example after an upshift by returning the accelerator pedal, a condition arises in which the range shift that just took place, which takes place at a predetermined transmission ratio shift range, is canceled. By means of a jerking of the motor vehicle during a range shift, feedback to the foot operating the accelerator pedal can take place, whereby the oscillation is amplified.

It is known that in automated transmissions such oscillations can be counteracted by using shift characteristic curves having hysteresis. That is not possible with branched power transmissions with several steplessly adjustable transmission ratio ranges, because the shift between the transmission ratio ranges in both directions necessarily takes place at a predetermined transmission ratio shift.

An object of the invention is to eliminate shift range oscillations in branched power transmissions having several steplessly adjustable transmission ratio ranges.

SUMMARY OF THE INVENTION

The objective is achieved by a method for controlling the operation of a motor vehicle drive train having a drive motor and a branched power transmission with several steplessly adjustable transmission ratio ranges, between which shifting takes place at a predetermined transmission ratio shift range. By that method a target engine rotational speed dependent upon at least the position of an accelerator pedal and the motor vehicle speed is determined, and the transmission ratio corresponding to the target engine rotational speed and motor vehicle speed is determined and adjusted, whereby when there is a difference between the actual transmission ratio of the transmission and a transmission ratio range shift that falls below a limit value, the accelerator pedal position that is utilized for determining the target engine rotational speed, and/or the target engine rotational speed itself, is filtered.

In accordance with the invention, the change with respect to time of the accelerator pedal position and/or the target engine rotational speed is consequently diminished in the vicinity of the transmission ratio range shift.

Accelerator pedal value changes within a predetermined magnitude are advantageously filtered with a predetermined time constant, and the portion of the accelerator pedal value change that exceeds the predetermined magnitude remains unfiltered.

With a preferred embodiment of the method of the invention, when a difference between the actual transmission ratio and a transmission ratio shift range that is utilized for determining the target engine rotational speed falls below a limiting value, the change with respect to time of the motor vehicle speed is filtered.

An apparatus for controlling the operation of a motor vehicle drive train having a drive motor and a branched power transmission with several steplessly adjustable transmission ratio ranges, between which shifting takes place at a predetermined transmission ratio range shift and with which the above-mentioned object of the invention is accomplished, includes a unit for determining a target engine rotational speed dependent at least upon the position of an accelerator pedal and the motor vehicle speed, and a unit for adjusting the transmission ratio of the transmission such that the actual engine rotational speed approaches the target engine rotational speed, which units are constructed in such a way that they operate to correspond in accordance with one of the above-mentioned methods.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1A:
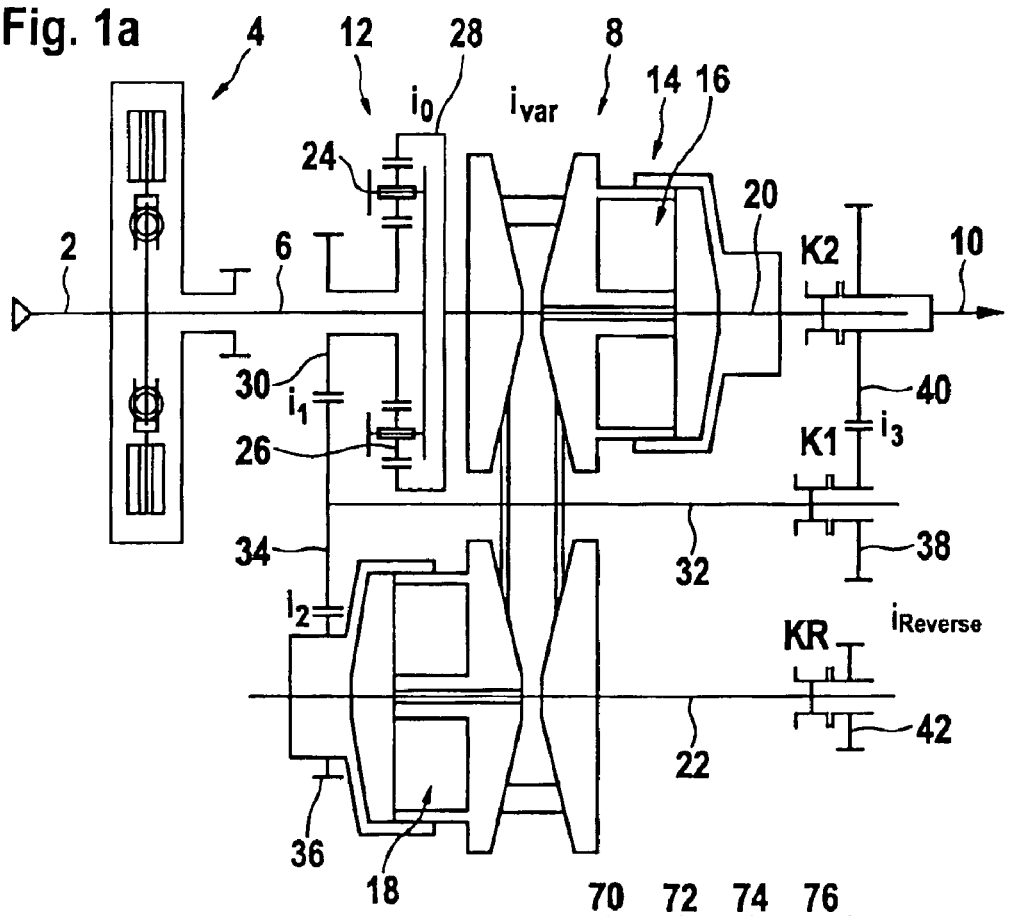
FIG. 1*a* is a diagrammatic view showing a branched power transmission.

As shown in FIG. 1*a*, a crankshaft 2 of an internal-combustion engine (not shown) is connected through a starting clutch 4 with an input shaft 6 of a branched power transmission, designated generally by reference numeral 8, that includes an output shaft 10. The arrows on crankshaft 2 and on output shaft 10 designate the direction of torque flow through the transmission when the internal-combustion engine is running.

Transmission 8 includes a coupler mechanism 12, and a variable speed unit 14 having a first conical pulley pair 16 and a second conical pulley pair 18. The first conical pulley pair is drivingly connected with an input shaft 20 of the variable speed unit. The second conical pulley pair is drivingly connected with an output shaft 22 of the variable speed unit.

Input shaft 6 is drivingly connected with a carrier 24 of coupler mechanism 12, which can be constructed as a simple planetary transmission. Planet gears 26 supported on carrier 24 mesh with the internal teeth of a ring gear 28, which is drivingly connected with input shaft 20.

Planet gears 26 further mesh with a tooth system of a sun gear 30, which forms the output gear of the coupler mechanism in the illustrated embodiment, and meshes with an intermediate gear 34 that is drivingly connected with an intermediate shaft 32. Intermediate shaft 32 is positioned functionally parallel to variable speed unit 14. Intermediate gear 34 meshes with a gear 36 that is drivingly connected with output shaft 22.

On the output side, intermediate shaft 32 is drivingly connected through a clutch K1 with a clutch gear 38 that meshes with a drive gear 40 that is drivingly connected with output shaft 10.

Input shaft 20 is drivingly connected with output shaft 10 through a clutch K2. Output shaft 22 of the variable speed unit is drivingly connected through a clutch KR with a reverse gear 42 that is provided for rearward movement of the motor vehicle. The transmission ratios produced by the individual elements of the illustrated transmission are respectively designated by i and an associated subscript.

Figures 2, 3:
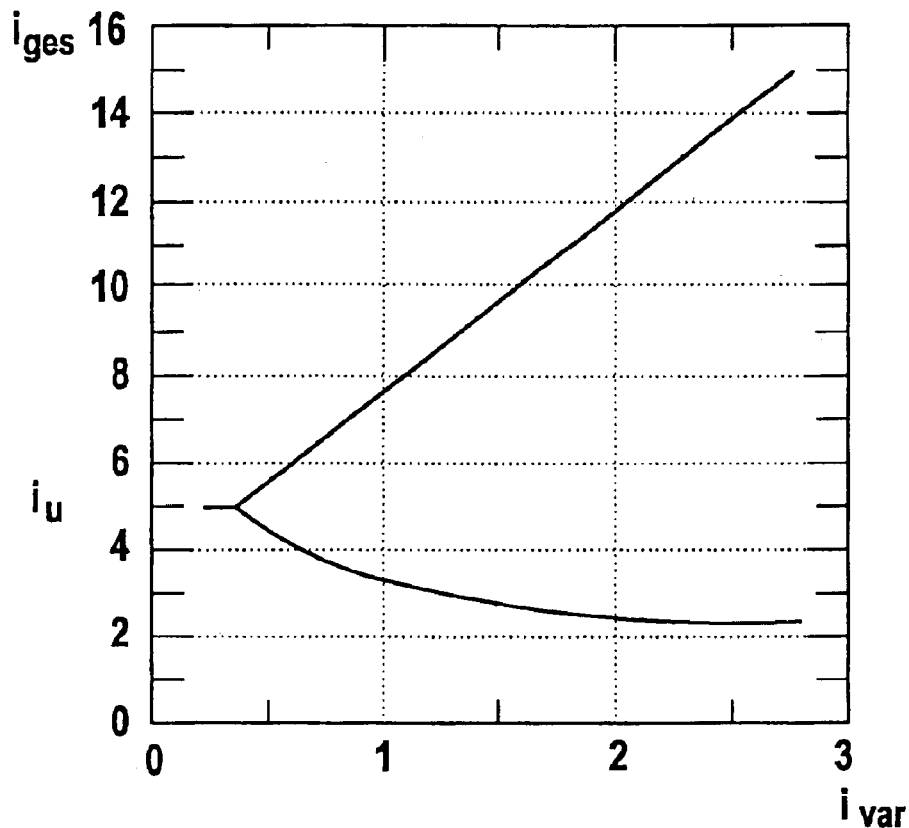
FIG. 2 is a graph showing the transmission ratio of the transmission shown in FIG. 1*a* as a function of the transmission ratio of the variable speed unit.
FIG. 3 is a shift table showing the shift condition of the clutches of the transmission shown in FIG. 1*a*.

FIG. 2 shows the overall transmission ratio $i_{ges}$ of transmission 8 as a function of the variable speed unit transmission ratio $i_{var}$. As is apparent, the variable speed unit transmission ratio $i_{var}$ passes in a downward direction from a high transmission ratio $i_{ges}$ to a low transmission ratio $i_{ges}$ of the transmission, and after reaching the shift transmission ratio $i_u$ it passes from a low value to a higher value in the opposite direction.

FIG. 3 shows the operation table for the clutches.

When driving in reverse, clutch KR is engaged and clutches K1 and K2 are disengaged. In the neutral position, all clutches are disengaged.

In the stage D-low (high transmission ratios), clutch K1 is engaged and clutches KR and K2 are disengaged. In the stage D-high (low transmission ratios), clutches KR and K1 are disengaged and clutch K2 is engaged.

Figure 1B:
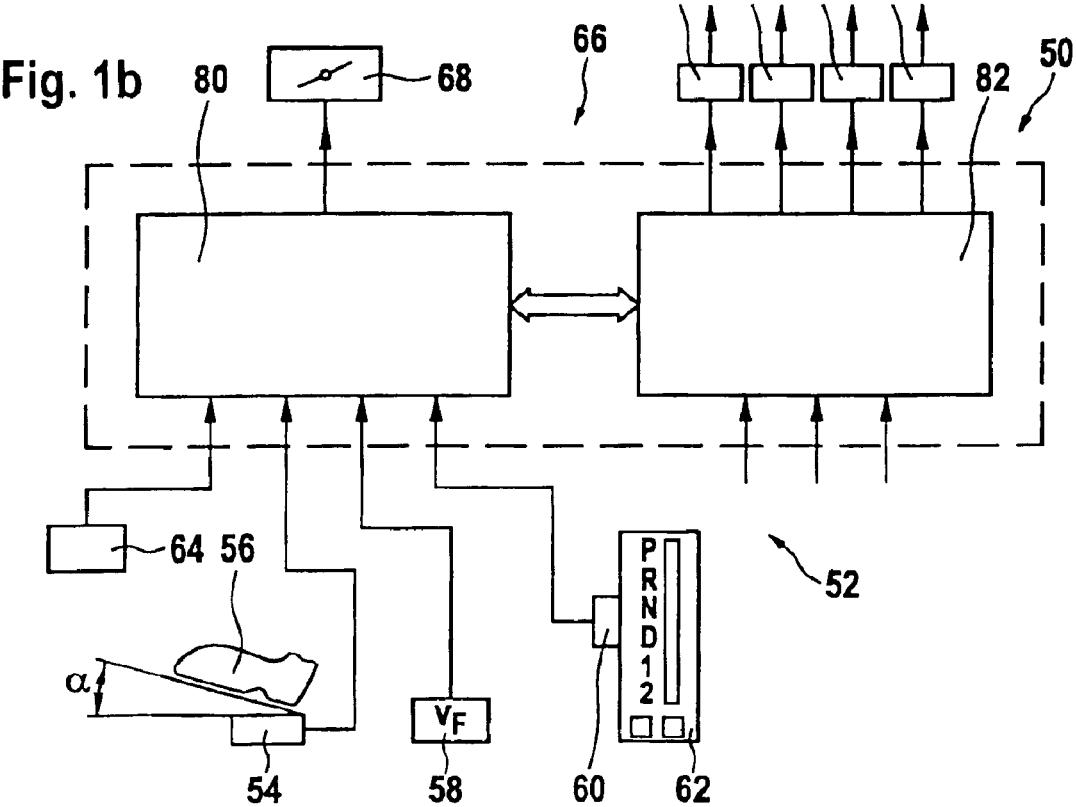
FIG. 1*b* is a block diagram showing a control arrangement for the transmission shown in FIG. 1*a;*

Referring to FIG. 1b, an electronic control unit, designated generally by reference numeral 50, is provided for controlling the transmission, and includes in a known manner a microprocessor with associated program memory and data memory. Inputs to electronic control unit 50, which are collectively designated as 52, are connected with an accelerator pedal sensor 54 for detecting the position of an accelerator pedal 56, a speed sensor 58 for detecting the speed of the vehicle, for example the wheel rotational speed or the rotational speed of output shaft 10, a sensor 60 for detecting the position of an actuation unit 62 that allows a choice between various gear stages and/or driving programs, a rotational speed sensor 64 for detecting the rotational speed of the engine, as well as further sensors (not shown), such as a sensor for detecting the rotational speed of input shaft 6, the rotational speed of input shaft 20, the rotational speed of the output shaft 22, sensors for detecting the positions of clutches K1, K2, and KR, and the like.

Outputs from electronic control unit 50 are designated generally by reference numeral 66 and are connected with a power output actuator 68 of the internal-combustion engine, an actuator 70 for controlling the pressure in pressure chambers of the variable speed unit for adjusting its transmission ratio, actuators 72, 74, and 76 for actuating clutches K1, K2, and KR, as well as possible additional actuators.

The structure and function of the described elements are known and are therefore not explained in further detail.

As is apparent from FIG. 2, the adjustment between the two transmission ratio stages of D-low and D-high of the transmission by a precisely defined overall transmission ratio at which exactly the same overall transmission ratio $i_u$ (about 4.8 in the illustrated example) of the overall transmission 8, corresponds with a specified variable speed unit transmission ratio $i_{var}$ (about 0.4 in the illustrated example) when clutch K1 is engaged and/or clutch K2 is engaged.

It is known to design electronic control unit 50 in such a way that a target engine rotational speed $n_{target}$ or a target transmission ratio $i_{target}$ is determined in a functional module 80 as a function of the position α of accelerator pedal 56 and the motor vehicle speed $v_F$ 58. The transmission ratio $i_{ges}$ of the transmission is adjusted in a functional module 82 that communicates bidirectionally with functional module 80, such that the target engine rotational speed $n_{target}$ or target transmission ratio $i_{target}$ is set by adjusting variable speed unit 14 as well as, if necessary, shifting of clutches K1 and K2.

If in FIG. 2 as a consequence of a slow return of the accelerator pedal, for example, the transmission ratio $i_{ges}$ of the transmission takes longer to adjust, clutch K1 is disengaged and clutch K2 is engaged when transmission ratio shift range $i_u$ is reached. If the accelerator pedal is once again more strongly actuated in the region of transmission ratio shift range $i_u$, that leads to a change in transmission ratio $i_{ges}$ to higher values so that the range shift is momentarily canceled. That can lead to oscillating shifts, in which successive range shifts rapidly and repeatedly occur, which has a detrimental influence upon comfort and transmission life.

Figure 4:
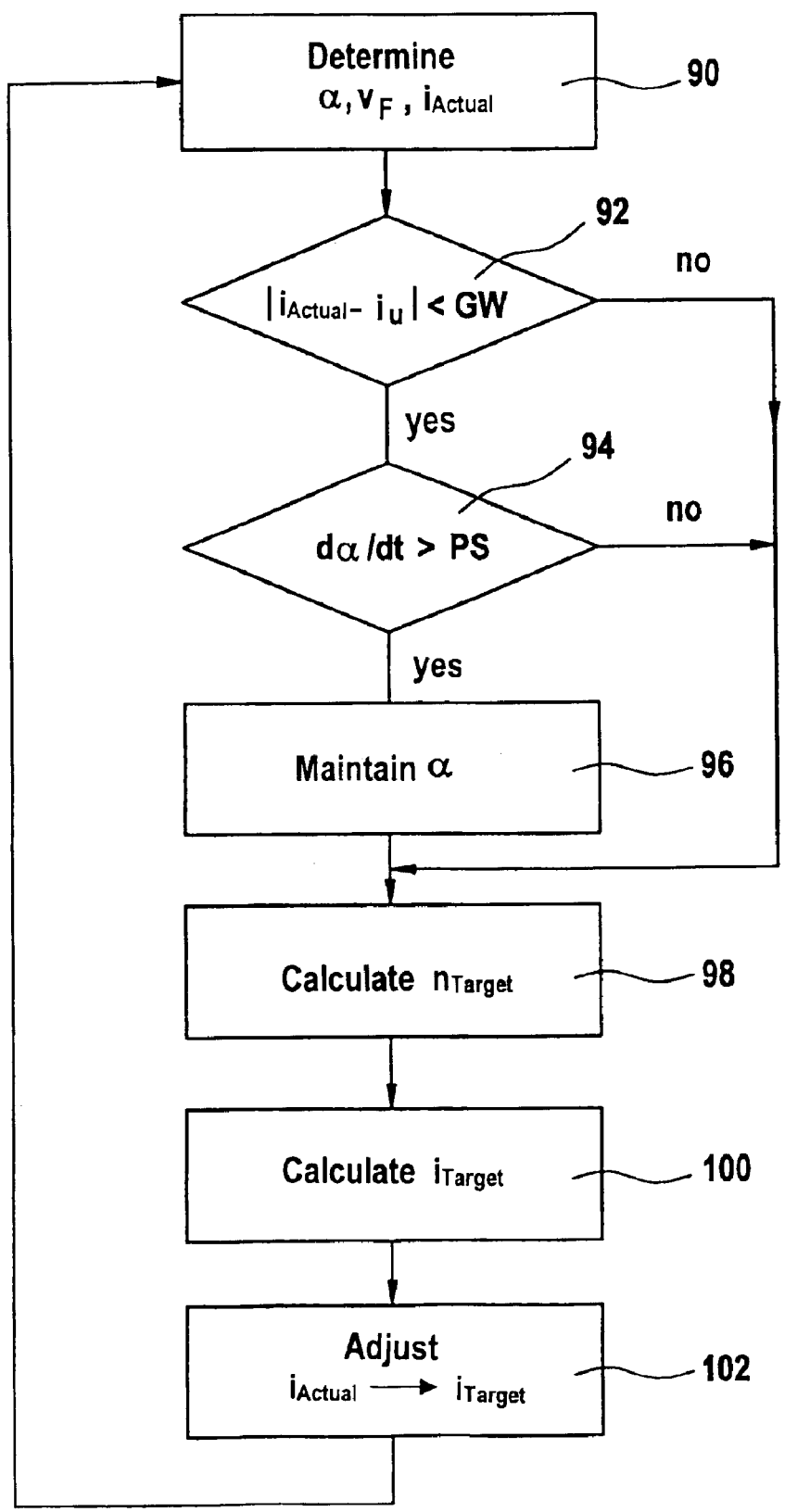
FIG. 4 is a flow diagram showing steps of a control method in accordance with the invention.

In order to counteract such oscillating shifts, it is possible to proceed as shown in FIG. 4.

The electronic control device routinely determines in step 80 the position α of the throttle valve, the motor vehicle speed $v_F$, and the actual transmission ratio $i_{actual}$ of the transmission or the variable speed unit.

In step 92, the system examines whether the actual transmission ratio differs from the transmission ratio shift range $i_u$ by less than a limit value. If that is the case, then in step 94 the system examines whether the change with respect to time, dα/dt, of the accelerator pedal position α is above an accelerator pedal threshold value PS. If that is the case, then in step 96 the accelerator pedal value is held constant for a predetermined time. The target rotational speed of the motor $n_{target}$ is subsequently calculated in step 98. Then, in step 100 the target transmission ratio $i_{target}$ of the transmission is calculated on the basis of the motor vehicle speed and the target rotational speed of the engine. In step 102, the transmission ratio is changed in the direction $i_{target}$ or is adjusted to $i_{target}$. The system thereafter returns to step 90.

If it is established in step 92 that the actual transmission ratio is different by a larger amount than limit value GW from the transmission ratio shift range, the system immediately jumps to step 98.

If it is established in step 94 that the change with respect to time of the accelerator pedal position α is less than the accelerator pedal threshold value PS, the system likewise jumps to step 98.

By smoothing the accelerator pedal value α or by holding it constant for a short time, the system has sufficient time for a stable range shift, which for example occurs in the order of magnitude of about 100 ms.

Steps 94 and 96 provide filtering of accelerator pedal position value α, which can be carried out in many different ways. For example, the accelerator pedal value α, which is used for selecting the engine target rotational speed $n_{target}$ from a characteristic field as a function of the motor vehicle speed $v_F$ and the accelerator pedal value α, is changed by being filtered such that the accelerator pedal position value jumps that are under 5 degrees are filtered within 0.5 seconds and those portions of an accelerator pedal position value jumps that exceed 5 degrees are allowed through unfiltered. In that way the result is that oscillations that are produced by rapid accelerator pedal position value changes having small amplitudes are securely suppressed, and that on the other hand the system responds securely and rapidly to large accelerator pedal position value changes. A further example of the filtering of α is that, in meeting the criterion of step 92 α is basically held constant during a predetermined time period that is longer than the time period necessary for shifting the clutches. The filtering criteria and/or the holding time thereby depend upon the amount by which $i_{actual}$ differs from $i_u$. Furthermore, the variation of $i_{actual}$ from $i_u$ or the change with respect to time of α can be evaluated with respect to sense or direction, so that filtering of α only takes place when the accelerator pedal position value change results in a transmission ratio adjustment as a consequence that follows from the transmission ratio shift range $i_u$.

An alternative arrangement of steps 94 and 96 can actually occur as a "slipping average value."

$$\overline{\alpha_{new}} = \frac{\alpha}{n} + \frac{n-1}{n} \cdot \overline{\alpha_{old}}$$

Thereby the different strong filtering can take place any time by altering the parameter n, for example as a function of $$\frac{d\alpha}{dt}$$

(step 94):

$$n = \begin{cases} n = 1 & \frac{d\alpha}{dt} > PS \\ n = 100 & \text{otherwise} \end{cases}$$

In this example, only a rapid kickdown of the accelerator pedal would pass through steps 94 and 96 unimpeded and without delay, while all other types of accelerator pedal actuations would be highly smoothed.

The criterion of step 92 can be such that the actual transmission ratio $i_{actual}$ deviates by less than 2% to 10%, advantageously 5%, from the transmission ratio shift range $i_u$. Instead of the transmission ratio of the transmission, the transmission ratio of the variable speed unit can be relied upon.

In a changed implementation of the method, the motor vehicle speed $v_F$ is filtered in addition to or instead of the accelerator pedal position value, which directly influences the engine target rotational speed similar to α calculated through the characteristic field. Moreover, the change with respect to time of the engine target rotational speed can be restricted when the criterion of step 92 is up to 1,000 U/min/s.

Overall, the method illustrated leads to the transmission also dynamically following jump-like changes in the accelerator pedal position setting, as usual. Only when the accelerator pedal is rapidly moved precisely during a shift can it occur that the transmission follows the accelerator pedal actuation with a delay of from 0.1 to 0.5 seconds in order to ensure the end of a shift, and then if need be to cancel it.

It is to be understood that instead of the accelerator pedal signal, in accordance with the invention another signal indicative of driver desire for power output or motor vehicle acceleration can be filtered.

It is to be understood that the branched power shown represented in FIG. 1a is only an example, and that the invention can be utilized with all types of branched power transmissions in which shifting takes place between two steplessly adjustable transmission ratio ranges by operating at least one clutch.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the invention.

What is claimed is:

1. A method for controlling the operation of a motor vehicle drive train having an engine and a branched power transmission with several steplessly adjustable ranges of transmission ratios between which shifting takes place at a predetermined transmission ratio shift range, said method comprising the steps of: determining and adjusting at least one of a target engine rotational speed that is a function of the position of an accelerator pedal and the motor vehicle speed, and a target transmission ratio of the transmission corresponding to the target engine rotational speed and the motor vehicle speed, and reducing at least one of the time rate of change of accelerator pedal position and the time rate of change of target engine rotational speed when there is a difference between the actual transmission ratio of the transmission and a transmission ratio range shift that is utilized for determining the target engine rotational speed or the target transmission ratio that falls below a difference limit value.

2. A method according to claim 1, including the step of filtering accelerator pedal position value changes that lie within a predetermined range more strongly than accelerator pedal position value changes that exceed the predetermined range.

3. A method according to claim 1, including the step of filtering a time rate of change of motor vehicle speed when a difference between the actual transmission ratio of the transmission and a transmission ratio shift range that is utilized for determining the target engine rotational speed is less than a limit value.

4. A method according to claim 2, including the step of filtering a time rate of change of motor vehicle speed when a difference between the actual transmission ratio of the transmission and a transmission ratio shift range that is utilized for determining the target engine rotational speed is less than a limit value.

5. Apparatus for controlling the operation of a motor vehicle drive train having a drive motor and a branched power transmission with several steplessly adjustable transmission ratio ranges between which shifting is effected at a predetermined transmission ratio shift range, said apparatus comprising: a first functional unit for determining a target engine rotational speed as a function at least of the position of an accelerator pedal and a vehicle speed, and a second functional unit for setting the transmission ratio of the transmission so that an actual engine rotational speed approaches a target engine rotational speed, which functional units operate to reduce at least one of the time rate of change of accelerator pedal position and the time rate of change of target engine rotational speed when there is a difference between the actual transmission ratio of the transmission and a transmission ratio range shift that is utilized for determining the target engine rotational speed or the target transmission ratio that falls below a difference limit value.

6. Apparatus for controlling the operation of a motor vehicle drive train having a drive motor and a branched power transmission with several steplessly adjustable transmission ratio ranges between which shifting is effected at a predetermined transmission ratio shift range, said apparatus comprising: a first functional unit for determining a target engine rotational speed as a function at least of the position of an accelerator pedal and a vehicle speed, and a second functional unit for setting the transmission ratio of the transmission so that an actual engine rotational speed approaches a target engine rotational speed, which functional units operate to filter accelerator pedal position value changes that lie within a predetermined range more strongly than accelerator pedal position value changes that exceed the predetermined range.

* * * * *

UNITED STATES PATENT AND TRADEMARK OFFICE
CERTIFICATE OF CORRECTION

PATENT NO. : 6,945,907 B2
DATED : September 20, 2005
INVENTOR(S) : Martin Vornehm et al.

It is certified that error appears in the above-identified patent and that said Letters Patent is hereby corrected as shown below:

Title page,
Item [12], delete "Vornhem et al." and insert therefor. -- Vornehm et al. --; and
Item [75], Inventors, delete "Vornhem" and insert therefor. -- Vornehm --.

Signed and Sealed this

Twenty-second Day of November, 2005

JON W. DUDAS
*Director of the United States Patent and Trademark Office*